United States Patent [19]

Kempf et al.

[11] Patent Number: 4,765,178

[45] Date of Patent: Aug. 23, 1988

[54] HYDROCARBON PROBE

[75] Inventors: David N. Kempf, Indianapolis; Ford C. Jefferson, Beech Grove; Brian L. Chandler, Indianapolis, all of Ind.

[73] Assignee: Emhart Industries, Inc., Indianapolis, Ind.

[21] Appl. No.: 846,122

[22] Filed: Mar. 31, 1986

[51] Int. Cl.[4] ............................................. G01M 3/16
[52] U.S. Cl. ....................................................... 73/49.2
[58] Field of Search ................. 73/49.2, 49.3, 40.5 R, 73/40; 254/134.3 FT

[56] References Cited

U.S. PATENT DOCUMENTS

| 4,083,532 | 4/1978 | Pola | 254/134.3 FT |
| 4,116,045 | 9/1978 | Potter | 73/61.1 R |
| 4,221,125 | 9/1980 | Oliver et al. | 73/61.1 R |
| 4,442,405 | 4/1984 | Andrejasich et al. | 324/439 |
| 4,660,026 | 4/1987 | Chandler | 73/49.2 X |

FOREIGN PATENT DOCUMENTS

| 2311953 | 9/1974 | Fed. Rep. of Germany | 73/49.3 |
| 2329525 | 1/1975 | Fed. Rep. of Germany | 73/49.3 |
| 108012 | 8/1979 | Japan | 73/49.2 |

Primary Examiner—Stewart J. Levy
Assistant Examiner—Joseph W. Roskos
Attorney, Agent, or Firm—Carl A. Forest

[57] ABSTRACT

A casing having rounded corners for ease of insertion into narrow confines defines a protective chamber and has openings permitting fluids exterior to the casing to enter the chamber. There is a fluid monitor within the chamber having a surface adapted for exposure to the fluids. There is a compartment within the casing insulated from the fluids and containing a second fluid monitor. A stainless steel cable is attached to the casing for inserting the probe between the walls of a double-walled tank. In an alternative embodiment there is a channel within the casing for receiving the distal end of an electrician's fish.

7 Claims, 3 Drawing Sheets

HYDROCARBON PROBE

BACKGROUND OF THE INVENTION

1. Field of the Invention

The invention in general relates to fluid detector probes for differentiating between a polar and a non-polar liquid and a gas, such as water, oil, and air, and in particular to a compact rugged probe that can be inserted into constricted areas.

2. Description of the Prior Art

Fluid detector probes that differentiate between polar and non-polar liquids and gases have been used for some time to detect hydrocarbon pollutants. They have become particularly important in detecting the presence of leaks in tanks containing gasoline or oil. See, for example, U.S. Pat. Nos. 4,116,045 issued to Bronson M. Potter, 4,221,125 issued to John N. Oliver and Louis M. Sandler, 4,442,405 issued to Raymond J. Andrejasich and Ralph A. Perry and United States Patent application Ser. No. 579,431 on an invention of Raymond J. Andrejasich.

The state-of-the-art detector probes, such as described in the Andrejasich references mentioned above, generally include a float which moves vertically along a guide wire in a pipe and a pair of polar-non-polar fluid monitoring elements mounted on the float. A reed switch is also mounted on the float, which reed switch responds to a magnet located at or near the bottom of float travel, to provide a fluid state signal indicative of whether the float is resting at the bottom of float travel or is floating, i.e. whether the detector probe is in a gas or a liquid.

While these detector probes have become progressively more reliable, they have remained bulky. Thus, such probes have not been employed in some locations, such as between the walls of a double-walled tank, where it would be highly useful to detect hydrocarbons. This has been a significant problem in the industry because correction of a leak in the inner wall of a double-walled tank is usually relatively inexpensive, as compared to the cleanup that can be required upon leakage through both walls. The prior art probes, in addition to being bulky, are susceptible to mechanical damage under rough handling or operating conditions.

SUMMARY OF THE INVENTION

It is an object of the invention to provide fluid detector probe that is compact enough to fit in small spaces, such as between the walls of a double-walled tank.

It is another object of the invention to provide a probe providing the above object and having a means for inserting the probe into narrow confines.

The invention provides a casing defining a chamber and having at least one opening for permitting fluids exterior to said casing to enter the chamber, a fluid monitoring means within the chamber, and a means attached to the casing for inserting the casing between the walls of a double-walled tank. Preferably, the means for inserting comprises a stainless steel cable. Preferably, there is a means for connecting to a fish on the distal end of the cable. Alternatively, the means for inserting comprises a means for receiving the distal end of a fish. Preferably, the means for receiving comprises a channel formed in the casing. Preferably, the casing has rounded corners for ease of insertion into confined areas.

The detector according to the invention is much smaller than any prior art hydrocarbon/water detector and also is much more rugged, which permits is to be placed in locations which are difficult to reach. Numerous other features, objects and advantages of the invention will become apparent from the following detailed description when read in conjunction with the accompanying drawings.

DESCRIPTION OF THE PREFERRED EMBODIMENT

Figure 1:
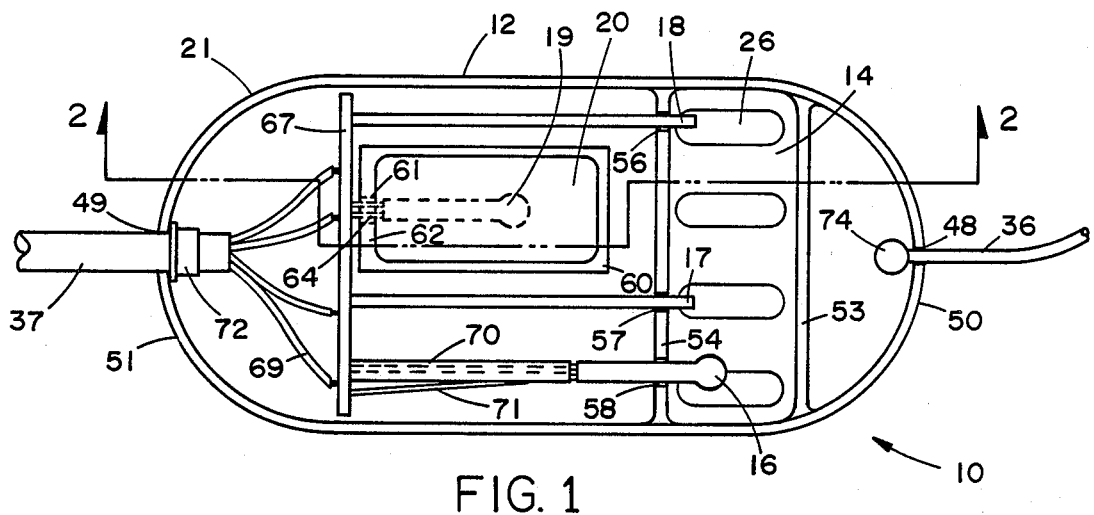
FIG. 1 is a plan view of the preferred embodiment of a probe according to the invention having the cover of the casing removed.
Figure 2:
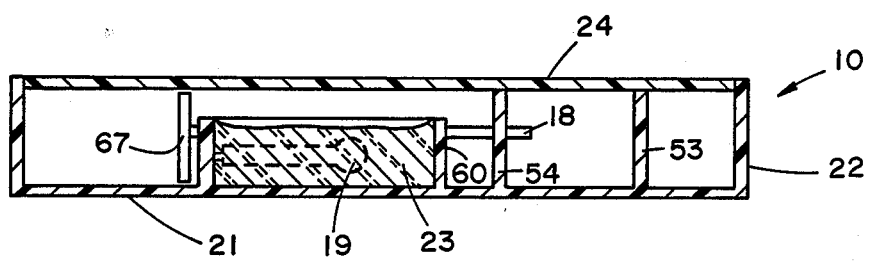
FIG. 2 is a cross-sectional view of the probe of FIG. 1 with the casing cover in place taken through the line 2—2 of FIG. 1.

Directing attention to FIG. 1, a plan view of the interior of the preferred embodiment of a detector probe 10 according to the invention is shown. Probe casing 12 defines a chamber 14 containing monitoring elements 16, 17, 18. Monitoring element 19 is enclosed in a compartment 20 which is filled with insulating material 23 to encapsulate the element 19 (FIG. 2). The casing 12 is closed with a cover 24 (FIG. 2) and includes openings 26 to permit external fluid to enter chamber 14 within the casing in which monitoring elements 16, 17, and 18 are exposed. Means 28 for inserting the casing between the walls 30 and 31 (FIG. 5A through 5D) of a double-walled tank 34 is attached to casing 12. Preferably, the means 28 includes a probe lead 36 having a means 40 for connecting to an electrician's fish. The compact size and shape of casing 12 and the rounded ends 50 and 51 permits it to be inserted into confined areas. Electric cable 37 connects the probe 10 to a probe cap 38 which contains an electric circuit (not shown) which provides an indication of the fluid environment of the probe.

Turning now to a more detailed description of the invention, the probe casing 12 is generally in the form of a thin box including casing body 21 and cover 24 having rounded ends 50 and 51. It is small enough to fit between the walls of a double-walled tank. In the preferred embodiment, casing 12 is about 2½ inches long, 1⅛ inches wide, and ⅜ inches deep. Slot 48 is of a size to receive and hold probe lead 36 and slot 49 is of a size appropriate to receive and hold electric cable 37. Two partitions 53 and 54 form a chamber 14 in casing 12.

Figure 3:
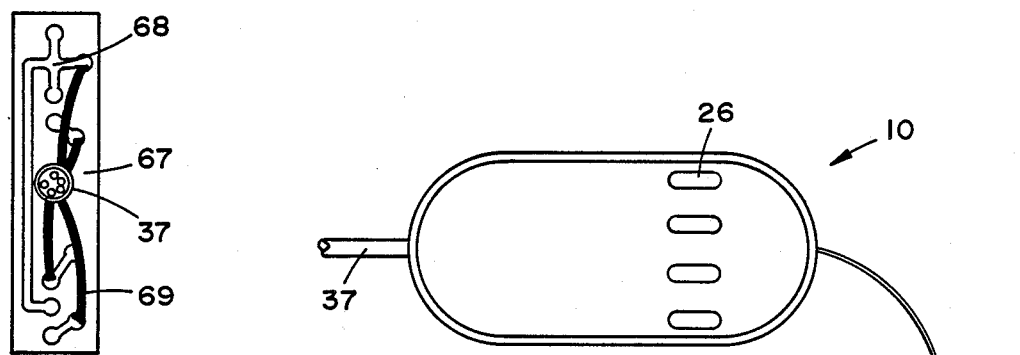
FIG. 3 is an end plan view of a connector for connecting an electrical cable to the probe.
Figure 4:
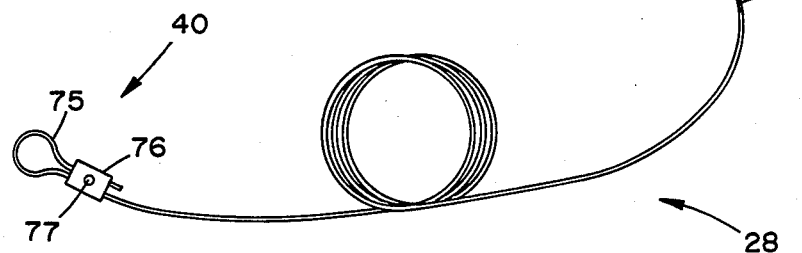
FIG. 4 is an external view of the probe of FIG. 1 (with the cover in place) showing details of the preferred embodiment of the probe lead.

Openings 26 are formed in casing body 21 and cover 24. Preferably openings 26 are ¼ inches by 1/16 inch and have rounded ends. Slots 56, 57 and 58 are formed in partition 54 to receive the necks of monitoring elements 16, 17 and 18. The slots are of a size that will hold the elements securely. A frame 60 forms a compartment 20 in casing body 21. A slot 61 is formed in one end 62 of the frame 60 to receive and hold the leads 64 of monitoring element 19. The compartment 20 is filled with an insulating material 23 to encapsulate element 19. Casing 12 also includes connector 67, the face of which is shown in FIG. 3. Connector 67 includes conductive traces 68. Wires 69 are part of electric cable 37 and connect to the traces 68. One lead connecting to monitoring element 16 is covered by an insulating sleeve 70 and the other lead 71 runs at an angle to the connector 67.

Connector 67 is the same height as partitions 53 and 54, which height is less than the height of the outer wall 22 of casing body 21 in an amount equal to the thickness of cover 24. The cover 24 is of a size to fit just within the inner periphery of wall 22. Thus the cover 24 when inserted in place is supported by connector 67 and partitions 53 and 54 to provide a flush exterior for casing 12. Collar 72 is attached to cable 37 to absorb any strain exerted on cable 37 tht would tend to pull on the connections between wires 70 and traces 68. Lead 36 has a ball 74 attached to one end to prevent it from pulling out of slot 48. The other end has a loop 75 formed in it, which loop is secured by a cable tie 76 having a set screw 77. The length of lead 36 is sufficient to extend it at least half way around the tank 34 and out of tank opening 39 (FIG. 5D).

Figure 5A:
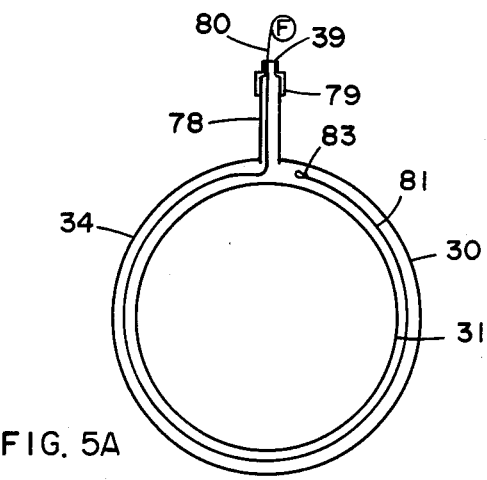
FIGS. 5A through 5D show the preferred method of installing a probe between the walls of a double-walled tank.
Figure 5B:
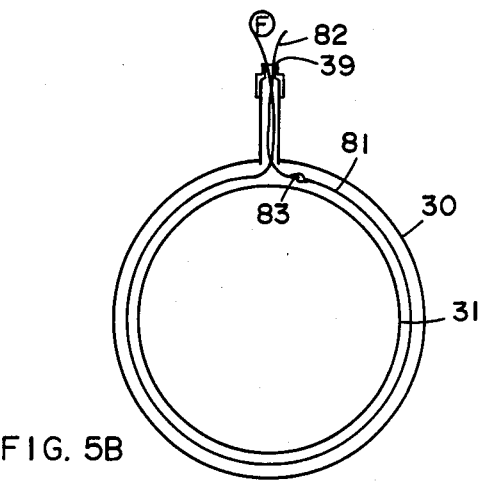
Figure 5C:
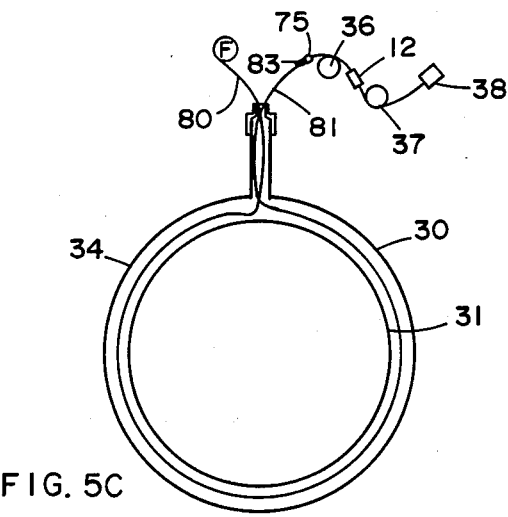
Figure 5D:
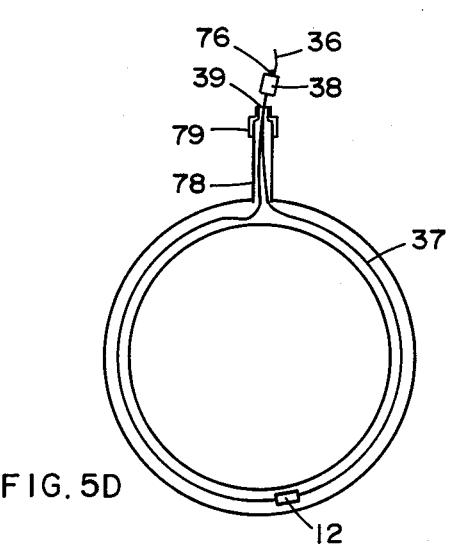
Figure 6:
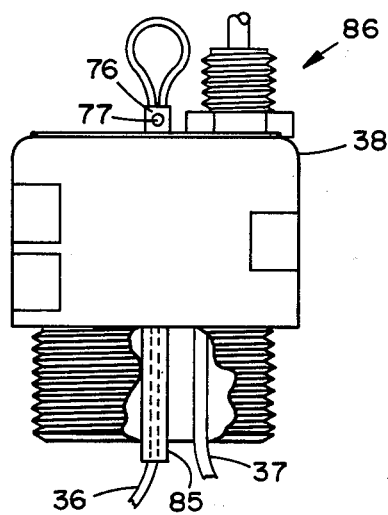
FIG. 6 shows detail of the preferred probe cap and lead.

Turning now to FIGS. 5A through 5D, the preferred method of insertion of the probe 10 into a double-walled tank 34 is shown. Tank 34 is shown sectioned through a fill port 78 which includes a threaded end member 79. The distal end 81 of an electrician's fish 80 is inserted in the tank opening 39 and runs around the tank until end 81 returns to the port 78 (FIG. 5A). A hook 82 or other engaging member is inserted through opening 39 (FIG. 5B), the end 81 is engaged by hooking it, and is then pulled out of the tank opening 39. The loop 75 at the end of the probe lead is attached to the distal end 81 of the fish by means of the conventional snubbing hook 83 at the end of fish (FIG. 5C) and the probe lead and probe are pulled around the tank until the probe is located in the desired position, which is generally the lowest point in the tank (FIG. 3B). The probe 10 may be accurately positioned in several ways. The length of cable 37 may be chosen so that it is approximately equal to the distance from the opening 39 to the desired location. Alternatively, the length of lead 36 may be selected so that the probe will be in proper position when the loop 75 of the lead emerges from port 78, or the cable 37 or lead 36 may be marked at the desired length. If the cable 37 or lead 36 are marked, they may be cut to the appropriate length once the probe 10 is in position. The lead 36 will extend out of the tank opening 39 when the probe 15 is in position. The lead loop 75 is disconnected from the fish end 81, the set screw 77 loosened, the cable tie 76 is removed from the lead 36 and the lead 36 is pulled through the lead guide 85 in the probe cap 38 (FIG. 5D and shown in detail in FIG. 6). Tie 76 is then replaced on the lead wire 36, the cap 38 is installed on the threaded end element 79 of port 78, the slack in the lead is pulled up, and the set screw 77 in tie 76 is tightened down with a wrench. An electric cable connector 86 may be attached to connect the probe electronics (not shown) to a central monitoring station (not shown).

Figure 7:
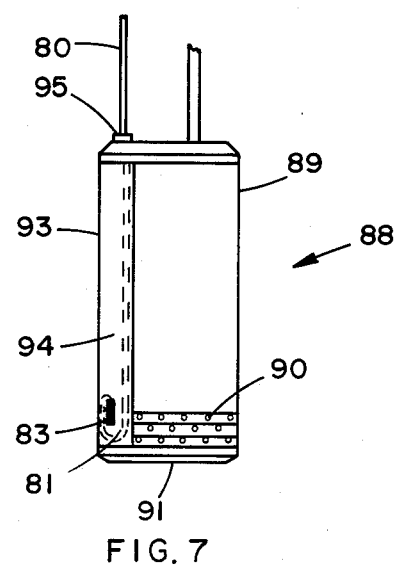
FIG. 7 shows an alternative embodiment of the probe.
Figure 8A:
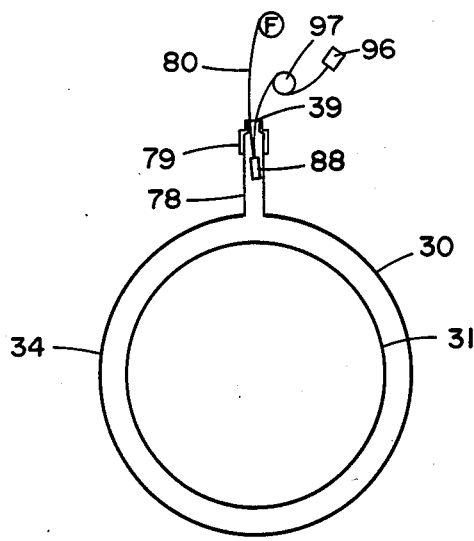
FIGS. 8A through 8C show an alternative method of installing a probe.
Figure 8B:
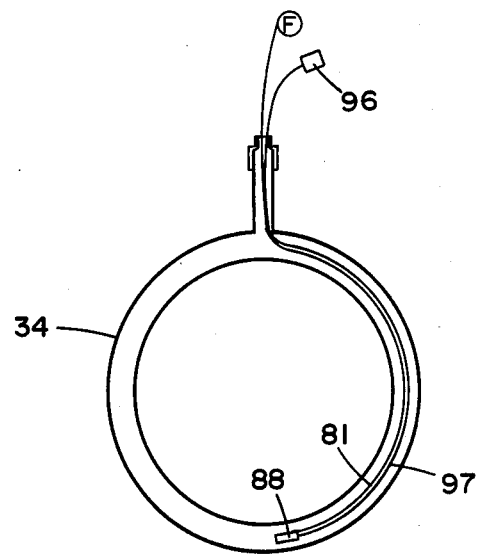
Figure 8C:
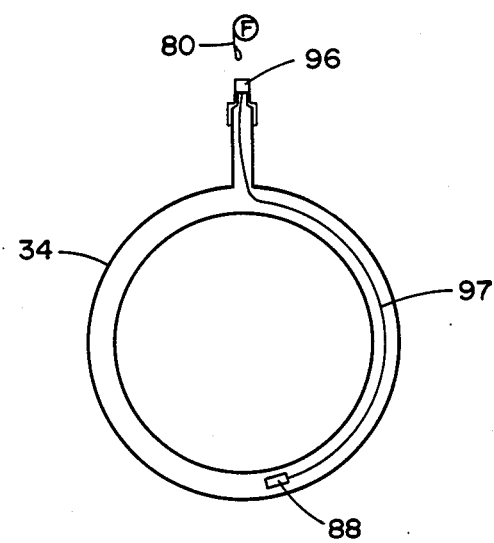

An alternative embodiment of a probe casing 89 according to the invention is shown in FIG. 7. This casing is more rectangular, has smaller openings 90, which are placed near end 91, and includes an extension 93 of the casing which forms a channel 94 for receiving the distal end 81 of fish 80 which is inserted through opening 95. The probe 88 of FIG. 7 may be installed in a tank 34 in an alternative method shown in FIGS. 8A through 8C. The fish distal end 81 is inserted into channel 94 in probe casing 89 (FIG. 8A) and the probe 88 is inserted through tank opening 39 and pushed down port 78 and into position in the tank (FIG. 8B). The fish is then withdrawn from the tank and the tank port 78 is closed with probe cap 96. In this embodiment, the probe cable 97 may be used to determine the proper position and to withdraw the probe casing 89 from the tank 34.

Figure 9:
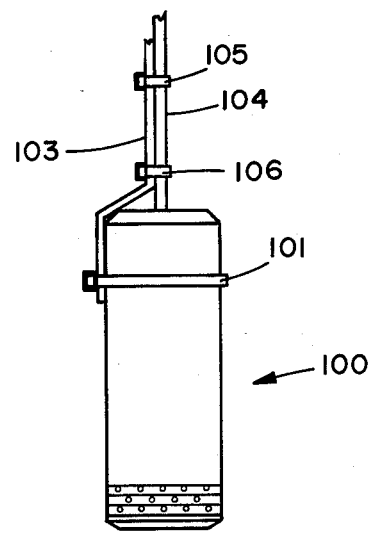
FIG. 9 shows another alternative embodiment of the probe attached to apparatus for another alternative installation method.

Another embodiment of a probe 100 according to the invention is shown in FIG. 9. This embodiment is similar to the embodiment of FIG. 7, except that the casing extension 93 has been eliminated. This embodiment is installed using a flexible rod 103 which is fastened to probe 100 by means of bracket 101 and to the probe cable 104 by clamps 105 and 106. This probe may be inserted into a confined area simply by pushing it into place with rod 103.

In the preferred embodiment, casing 12, 89 is molded out of PVC, the connector 67 is an etched circuit board with copper traces, the probe lead 36 is a nylon coated stainless-steel cable about 1/16 inches in diameter, the electric cable 37 is a teflon insulated electric cable, the fish 80 is a ¼ inch electrician's fish, monitoring elements 16 and 19 are Fenwall GB32P2 thermistors, monitoring elements 17 and 18 are 20 guage stainless steel wire, insulating material 23 is GE-118 self-leveling RTV, probe cap 38 is made of PVC, and lead tie 85, bracket 101, rod 103 and clamps 105 and 106 are made of stainless steel.

A novel detector probe that is compact and rugged has been described. Although the invention has been described in terms of specific embodiments, this is not intended to limit the invention. It is evident that those skilled in the art may now make many uses and modifications of the embodiments described, without departing from the inventive concepts. For example, other equivalent materials and parts may be used. Consequently, the invention is to be construed as embracing each and every novel feature and novel combination of features present in the probe described.

What is claimed is:

1. A probe for detecting the presence of fluids comprising:
    a casing defining a protective chamber and having at least one opening permitting fluid exterior to said casing to enter the chamber,
    a fluid monitoring means within said chamber,
    a cable attached to said casing for inserting said casing between the walls of a double-walled tank, and means on the distal end of said cable for attaching said cable to a fish.

2. The probe of claim 1 wherein said cable comprises a stainless steel cable.

3. The probe of claim 1 and further including an electrical cable attached to said casing and electrically connected to said fluid monitoring means.

4. A probe for detecting the presence of fluids comprising:
- a casing defining a protective chamber and having at least one opening permitting fluid exterior to said casing to enter the chamber,
- fluid monitoring means within said chamber,
- means attached to said casing for inserting said casing between the walls of a double-walled tank, and
- means defining a compartment insulated from contact with said fluid.

5. The probe of claim 4 and further including a thermistor within said compartment.

6. A probe for detecting the presence of fluids comprising:
- a casing defining a protective chamber and having at least one opening permitting fluid exterior to said casing to enter the chamber,
- fluid monitoring means within said chamber, and
- means on aid casing for inserting said casing between the walls of a double-walled tank, said means for inserting comprising means for receiving the distal end of a fish.

7. The probe of claim 6 wherein said means for receiving comprises a channel means formed in said casing.

* * * * *